(12) United States Patent
Ozawa

(10) Patent No.: US 6,795,155 B2
(45) Date of Patent: Sep. 21, 2004

(54) TRANSFLECTIVE LIQUID CRYSTAL DISPLAY DEVICE THAT CONTROLS DISINCLINATION CAUSED BY AN ELECTRIC FIELD

(75) Inventor: Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/717,526

(22) Filed: Nov. 21, 2003

(65) Prior Publication Data

US 2004/0100603 A1 May 27, 2004

Related U.S. Application Data

(62) Division of application No. 10/107,253, filed on Mar. 28, 2002.

(30) Foreign Application Priority Data

Mar. 28, 2001 (JP) ........................................ 2001-094081

(51) Int. Cl.[7] .............................................. C09K 19/02
(52) U.S. Cl. ....................... 349/179; 349/113; 349/123; 349/186; 349/141
(58) Field of Search ................................ 349/113, 179, 349/123, 186, 141

(56) References Cited

FOREIGN PATENT DOCUMENTS

| JP | 3-92628 | 9/1991 |
|---|---|---|
| JP | 4-223436 | 8/1992 |
| JP | 5-72533 | 3/1993 |
| JP | 2001-66593 | 3/2001 |

*Primary Examiner*—Tarifur R. Chowdhury
*Assistant Examiner*—P. R. Akkapeddi
(74) *Attorney, Agent, or Firm*—Oliff & Berridge, PLC

(57) ABSTRACT

The invention provides a liquid crystal device capable of obtaining a bright image with a high display quality by controlling disclination caused by a lateral electric field developed across a space between pixels, or the like. With a liquid crystal display of the present invention, where d is a layer thickness of a liquid crystal layer, then alignment treatment in a direction corresponding to a twist angle is applied onto each substrate in such a manner that, in a state that no voltage is applied, a direction of the long axis of a liquid crystal molecule positioned (1/4)d high from the surface of a bottom substrate is oriented to a direction that is perpendicular to extending direction of a space between the electrodes where a twist angle $\theta$ of the liquid crystal layer is in a range of $\theta \leq 90°$, and to a direction that is in parallel to the extending direction of the space between the electrodes where the twist angle $\theta$ of the liquid crystral layer is in a range of $180° \leq \theta \leq 270°$.

1 Claim, 10 Drawing Sheets

TRANSFLECTIVE LIQUID CRYSTAL DISPLAY DEVICE THAT CONTROLS DISINCLINATION CAUSED BY AN ELECTRIC FIELD

This is a Division of Application No. 10/107,253 filed Mar. 28, 2002. The entire disclosure of the prior application is hereby incorporated by reference herein in its entirety.

BACKGROUND OF THE INVENTION

1. Field of Invention

The present invention relates to a liquid crystal device and electronic apparatus. More particularly, the invention relates to an arrangement for a transflective liquid crystal device that includes a transflective film, having light transmitting opening portions, that also serves as pixel electrodes in the transmission mode.

2. Description of the Related Art

A reflective liquid crystal display consumes less power because it is not provided with a light source, such as a backlight, and has been used frequently in a display unit or the like as an attachment of various kinds of portable electronic apparatus or devices.

However, since outside light, such as natural light or illumination light, is used for a display, there is a problem that it is difficult to visually recognize a display in a dark place. Hence, there has been proposed a liquid crystal display that uses outside light in a bright place, like an ordinary reflective liquid crystal display, but that enables visual recognition of a display by an internal light source in a dark place. In other words, this liquid crystal display adopts a display method with both the reflection type and the transmission type, so that the display method is switched between the reflection mode and the transmission mode depending on the brightness of the surroundings, thereby enabling a sharp display even in dark surroundings, while also reducing power consumption. Hereinafter, the liquid crystal display of this type is referred to as a "transflective liquid crystal display" in the present specification.

As a type of the transflective liquid crystal display, the one provided with a transflective film, that is, a so-called "half mirror," has been known. In general, the transflective film is a film arranged so as to transmit light to some extent, while reflecting light to some extent by optimizing a film thickness of a film of metal, such as aluminum, used as a reflective film. However, there is a drawback in that a film forming technique, such as mask sputtering, is required to form a transflective film. The process also becomes more complicated, and the transmittance and the reflectance vary significantly due to considerable variance in film thickness.

Hence, in order to overcome the drawback of the transflective film, there has been proposed a liquid crystal display that is provided with a transflective film having light transmitting slits (opening portions) formed therein. When this liquid crystal display is used in the reflection mode in a bright place, outside light that is incident from above the top substrate passes through the liquid crystal layer, and is reflected at the portions other than the slits on the surface of the transflective film on the bottom substrate. Then, the light passes through the liquid crystal layer again, and travels out to the top substrate side. When the liquid crystal display is used in the transmission mode in a dark place, light emitted from a backlight that is provided below the bottom substrate passes through the slit portions of the transflective film. Then, the light passes through the liquid crystal layer and travels out to the top substrate side. These beams of light contribute to a display in each mode. The transflective film may be provided independently on the bottom substrate. However, because it is usually made of a film of metal, such as aluminum, it may also serve as pixel electrodes to drive liquid crystals. If the transflective film is used as such, an arrangement, such as the transflective liquid crystal display, becomes simpler.

Incidentally, in both cases of a passive matrix type and an active matrix type, the liquid crystal display is provided with a plurality of electrodes (which are generally referred to as "segment electrodes" in the passive matrix type, and as "pixel electrodes" in the active matrix type) to drive liquid crystals, which are arranged with a spacing of some micrometers on the bottom substrate. The liquid crystal molecules on the electrodes, especially those positioned at the center of the electrodes, are driven properly by a typical longitudinal electric field developed between the electrodes on the top and bottom substrates. However, the liquid crystal molecules disposed in a space between the electrodes, or in the vicinity of the edge portions of the electrodes, are susceptible to a lateral electric field developed between the adjacent electrodes, and a disturbance of the alignment (disclination) occurs. In particular, in case a reverse driving method to supply image signals of different polarities to the respective adjacent electrodes is adopted, the disclination caused by the lateral electric field appears noticeably. As a result, leakage of light occurs where it should be a black display, or conversely, the brightness is lowered when it should be a white display, and the contrast is deteriorated markedly. Hence, a countermeasure is taken to cover a disclination occurring area with a light-shielding film (black matrix). In such a case, however, there is a problem that the aperture ratio within the pixel is reduced, thereby making the display dark.

Also, the transflective liquid crystal display may adopt the arrangement that the electrodes, provided with slits on a one-by-one basis, also serve as the transflective film as discussed above. In such a case, like in the case of the liquid crystal molecules disposed in a space between the electrodes, the liquid crystal molecules above the slit are also susceptible to a lateral electric field that is developed from the surrounding electrodes, and the disclination occurs. Accordingly, a contrast-reduced area appears on the slit portion, which becomes a factor that further deteriorates the display quality. Moreover, such an occurrence of disclination also becomes an impediment to high definition.

SUMMARY OF THE INVENTION

The present invention addresses the above problems, and provides a liquid crystal device that is capable of obtaining a bright image with a high display quality by controlling disclination caused by a lateral electric field developed across a space between the pixels, or in the vicinity of the slit of the electrode in the device of the transflective type.

A liquid crystal device of the present invention includes a liquid crystal layer sandwiched by a pair of substrates, and at least one substrate of the pair of substrates is provided thereon with a plurality of electrodes to drive the liquid crystal layer. Where a twist angle $\theta$ of the liquid crystal layer sandwiched by the pair of substrates is in a range of $\theta \leq 90°$, and d is a layer thickness of the liquid crystal layer, then alignment treatment in a direction corresponding to the twist angle is applied onto each of the pair of substrates in such a manner that, in a state that no voltage is applied, a direction of the long axis of a liquid crystal molecule positioned (¼)d high from a surface of the one substrate is oriented to a direction that is perpendicular to a direction in which a space between the electrodes adjacent to each other extends.

Also, in the liquid crystal device, where a twist angle θ of the liquid crystal layer sandwiched by the pair of substrates is in a range of 180°≦θ≦270°, and d is a layer thickness of the liquid crystal layer, then alignment treatment in a direction corresponding to the twist angle is applied onto each of the pair of substrates in such a manner that, in a state that no voltage is applied, a direction of the long axis of a liquid crystal molecule positioned (¼)d high from a surface of the one substrate is oriented to a direction that is in parallel to a direction in which a space between the electrodes adjacent to each other extends.

The liquid crystal device having the above two features controls the disclination occurring chiefly between the pixels or at the periphery portions of the pixels, and is suited as a liquid crystal device to supply the respective adjacent pixels with image signals of different polarities, that is, the one adopting reverse driving as a driving method.

In addition, a liquid crystal device of the present invention that controls the disclination at an opening portion (slit) is a liquid crystal device includes a liquid crystal layer sandwiched by a pair of substrates, and at least one substrate of the pair of substrates is provided thereon with a plurality of electrodes that also serve as a transflective layer to reflect incident light from the other substrate side through the liquid crystal layer and transmit incident light from an outer surface side of the one substrate to the liquid crystal layer side through an opening portion, that is, a transflective liquid crystal display. Where a twist angle θ of the liquid crystal layer sandwiched by the pair of substrates is in a range of θ≦90°, and d is a layer thickness of the liquid crystal layer, then alignment treatment in a direction corresponding to the twist angle is applied onto each of the pair of substrates in such a manner that, in a state that no voltage is applied, a direction of the long axis of a liquid crystal molecule positioned (¼)d high from a surface of the one substrate is oriented to a direction that is perpendicular to a direction in which the opening portion extends.

Also, in the liquid crystal device, where a twist angle θ of the liquid crystal layer that is sandwiched by the pair of substrates is in a range of 180°≦θ≦270°, and d is a layer thickness of the liquid crystal layer, then alignment treatment in a direction corresponding to the twist angle is applied onto each of the pair of substrates in such a manner that, in a state that no voltage is applied, a direction of the long axis of a liquid crystal molecule that is positioned (¼)d high from a surface of the one substrate is oriented to a direction that is in parallel to a direction in which the opening portion extends.

As discussed, for liquid crystal devices in general, including a transflective liquid crystal device, the occurrence of disclination caused by a lateral electric field that is developed when a voltage is applied poses a significant problem. On the other hand, when the device is designed, it is necessary to set a bright view direction, which is defined as a direction along which the liquid crystal molecules rise up when a voltage is applied and a display is viewed most brightly, in such a manner that the occurrence of the disclination is reduced to the minimum. The disclination occurring circumstances vary depending on various parameters, such as the twist angle of the liquid crystal molecules, an opening width, and an applied voltage, and for this reason, the optimal bright view direction is conventionally found by performing an experiment each time the parameters change. However, it has been a great burden to find the bright view direction experimentally each time the device condition changes.

Hence, the inventor of the present invention examined, through simulations, which parameter of various device parameters exerts a significant influence to the bright view direction, that is, the occurrence of the disclination. As a result, the inventor discovered that the initial alignment direction (the alignment direction when no voltage is applied) of the liquid crystals with respect to a direction of a space between the pixels, or the opening portion, is deeply involved. Also, the inventor discovered there is a tendency that the optimal angular relation between the direction of the space between the pixels or the opening portion and the initial alignment direction of the liquid crystals differs in an area where the twist angle θ of the liquid crystal layer is θ≦90°, and that is deemed as an area where a change of the twist angle of the liquid crystal molecules is larger than a change of the tilt angle when a voltage is applied, and in an area where the twist angle θ of the liquid crystal layer is 180°≦θ≦270°, and that is deemed as an area where a change of the tilt angle of the liquid crystal molecules is larger than a change of the twist angle when a voltage is applied.

In other words, decrease of aperture ratio due to disclination can be reduced or minimized by applying the alignment treatment onto each substrate in such a manner that the major axial direction of the liquid crystal molecule positioned (¼)d (d: layer thickness of the liquid crystal layer) high from the surface of one substrate is oriented to a direction that is perpendicular to the extending direction of the space between the pixels, or the opening portion, when the twist angle θ is in a range of θ≦90°, and by applying the alignment treatment onto each substrate in such a manner that the major axial direction of the liquid crystal molecule positioned (¼)d high from the surface of one substrate is oriented to a direction that is in parallel to the extending direction of the space between the pixels, or the opening portion, when the twist angle θ is in a range of 180°≦θ≦270°. These characteristics of the present invention are introduced from the simulation results, and the detailed description will be given below. "One substrate" referred to herein is a substrate that is provided with a plurality of electrodes supplied with image signals, and is generally the bottom substrate.

An electronic apparatus of the present invention is provided with the liquid crystal device of the present invention. According to this arrangement, it is possible to achieve an electronic apparatus that is provided with a liquid crystal display unit that realizes a bright image with a high display quality.

DETAILED DESCRIPTION OF PREFERRED EMBODIMENTS

First Embodiment

The following description describes a first embodiment of the present invention in accordance with reference to FIGS. 1 through 4.

Figure 1:
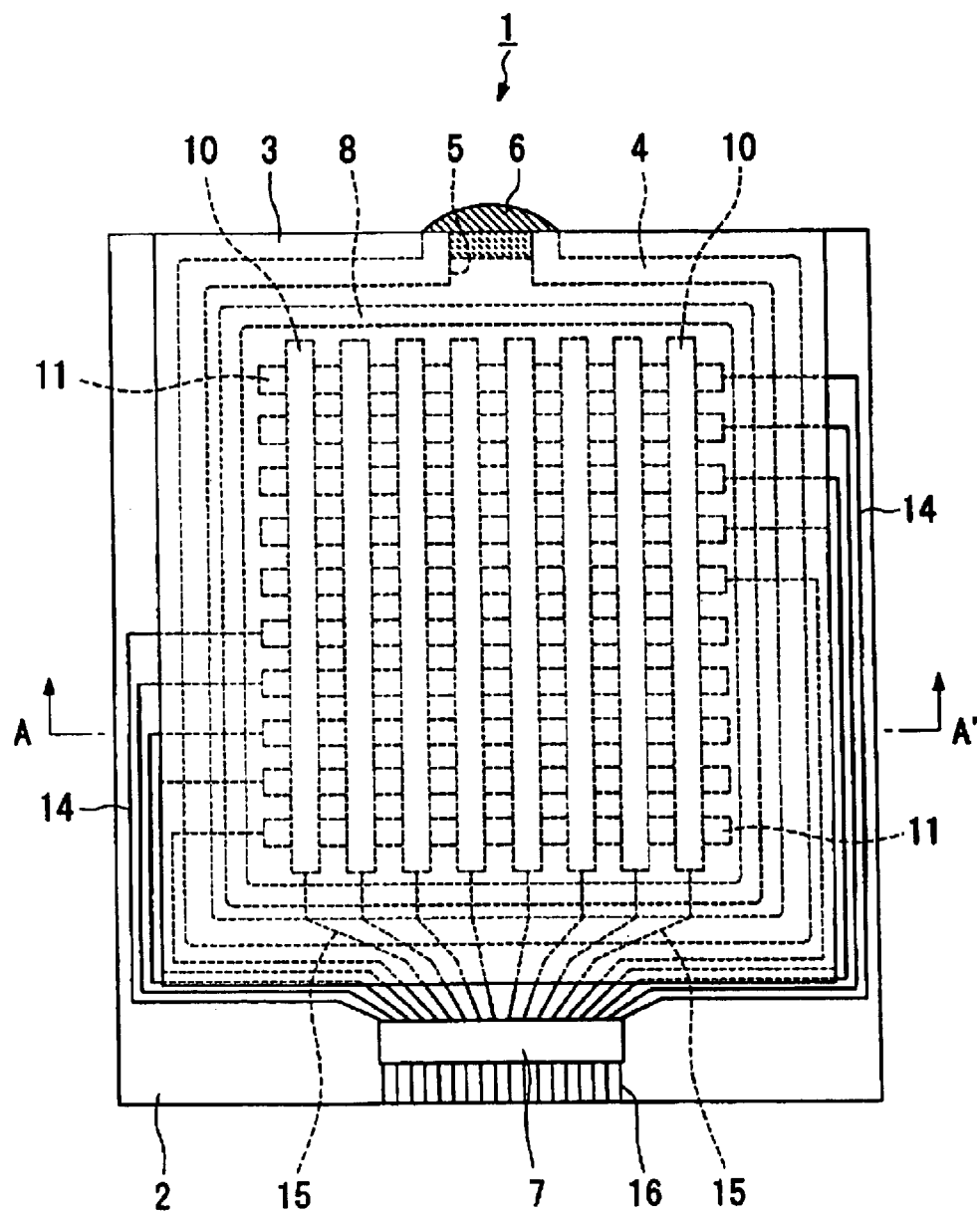
FIG. 1 is a plan view showing an entire arrangement of a liquid crystal display according to one embodiment of the present invention.
Figure 2:
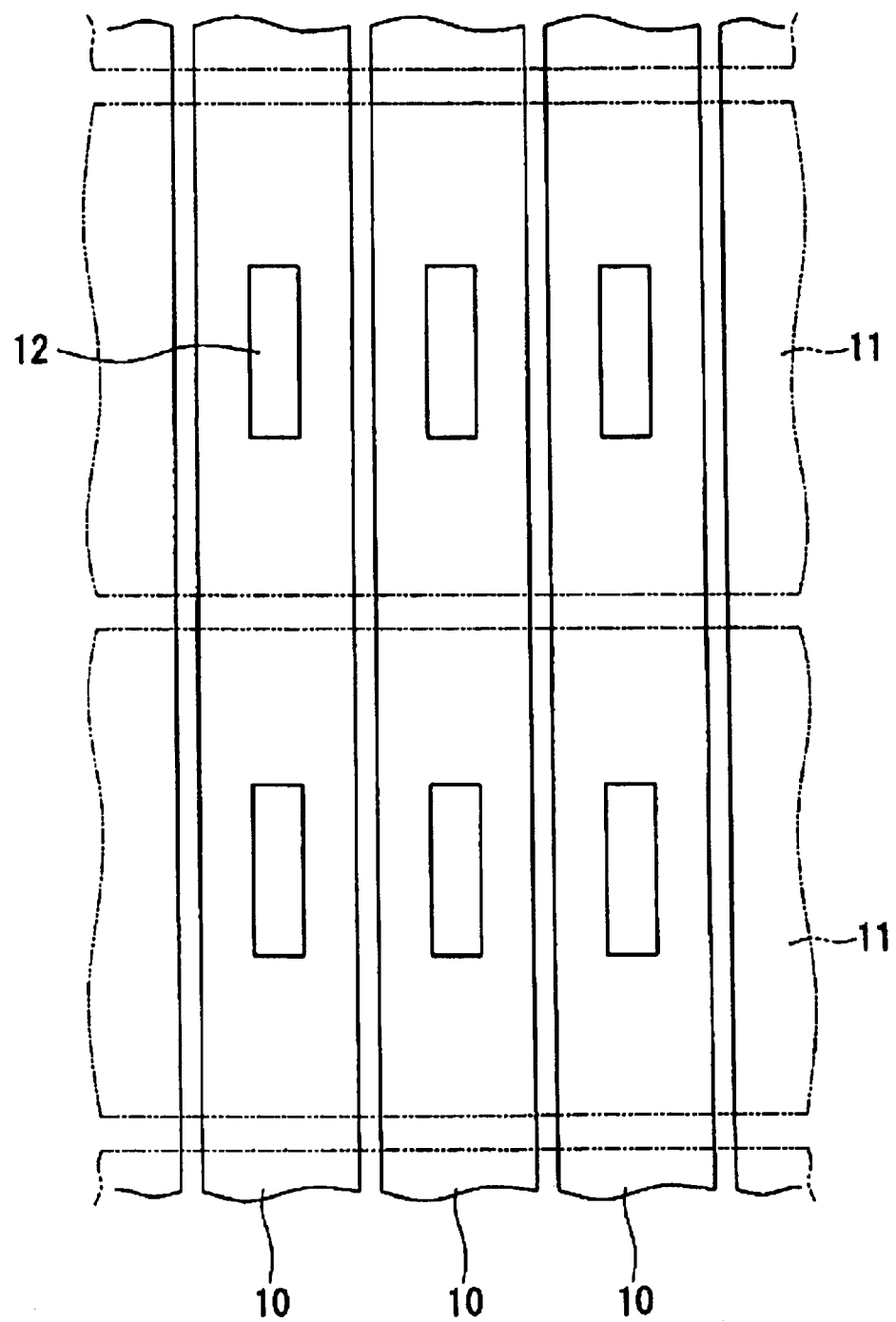
FIG. 2 is a plan view showing an enlarged display area of the liquid crystal display according to one embodiment of the present invention.
Figure 3:
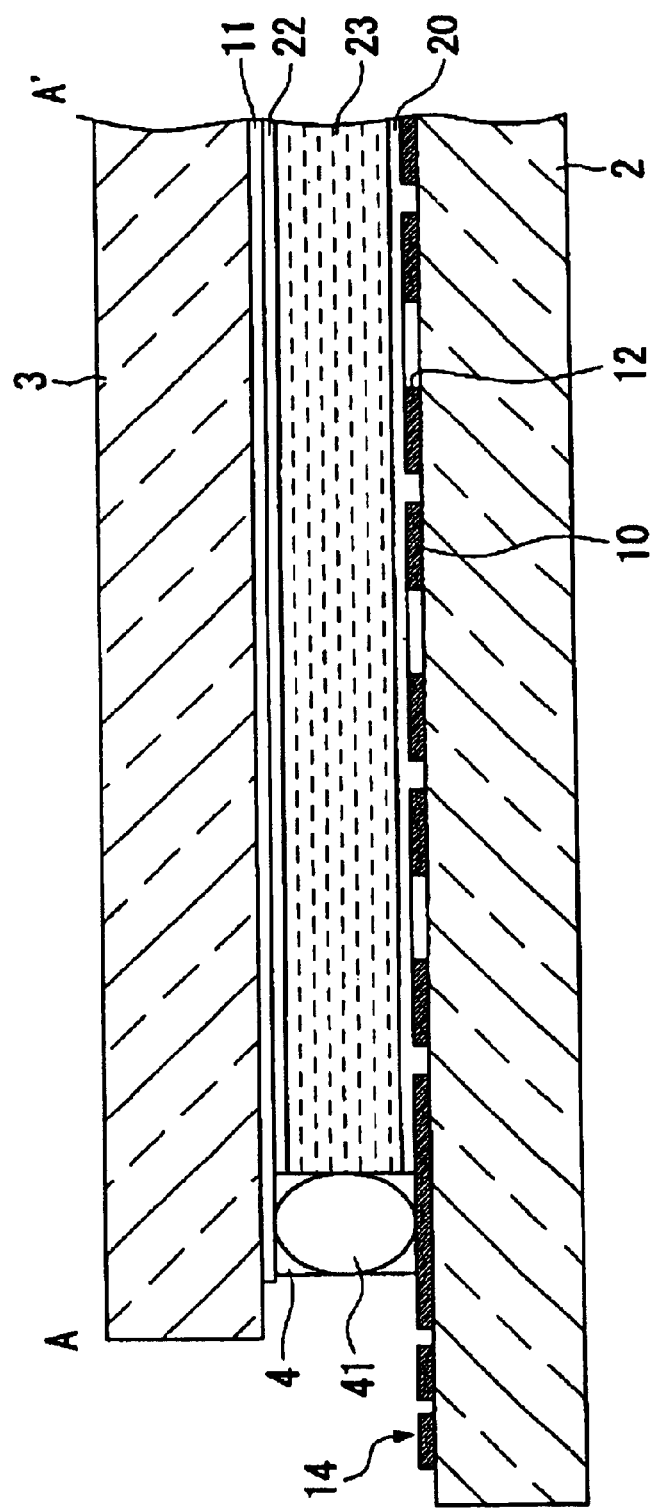
FIG. 3 is a cross sectional view taken along plane A–A' of FIG. 2.
Figure 4:
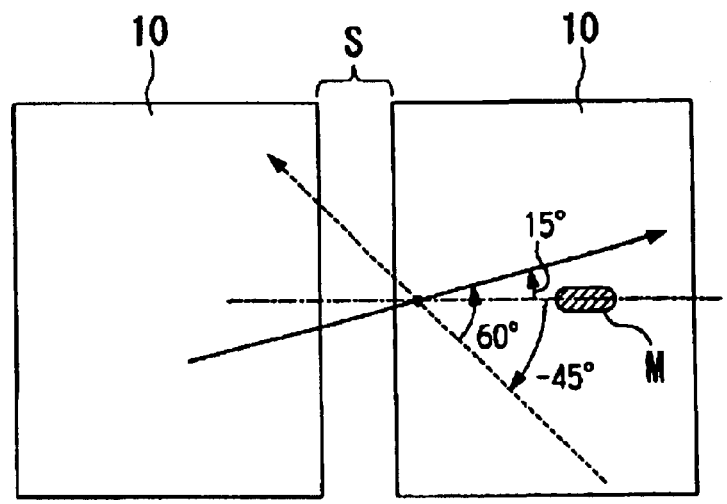
FIG. 4 is a schematic showing a rubbing direction on each substrate of the liquid crystal display according to one embodiment of the present invention.

FIG. 1 is a plan view showing an entire arrangement of a liquid crystal display of the present embodiment. FIG. 2 is an enlarged view of a display area of the liquid crystal display of the present embodiment. FIG. 3 is a cross sectional view taken along plane A–A' of FIG. 2. FIG. 4 is a plan view showing a rubbing direction on each substrate. The present embodiment describes a transflective liquid crystal display of the passive matrix method by way of example. In all of the drawings, a film thickness, a dimensional ratio, etc. of each component are changed as needed for ease of viewing.

As shown in FIG. 1, a liquid crystal display 1 of the present embodiment includes a bottom substrate 2 (one substrate) and a top substrate 3 (the other substrate), each of which is a rectangle when viewed in a plane and is placed to oppose the other through a sealing member 4. A part of the sealing member 4 is opened at one side of each of the substrates 2 and 3 (the top side in FIG. 1) and forms a liquid crystal inlet 5. A space surrounded by the two substrates 2 and 3 and the sealing member 4 is filled with liquid crystals, and the liquid crystal inlet 5 is sealed with a sealant 6. In the present embodiment, the bottom substrate 2 has a larger outer dimension than the top substrate 3, and they are placed in such a manner that the edges of the top substrate 3 and the bottom substrate 2 are aligned at one side (the top side in FIG. 1), and the circumferential portion of the bottom substrate 2 protrudes from the upper substrate 3 at the remaining three sides (the bottom side, right side, and the left side in FIG. 1). Also, a driving semiconductor element 7 that drives electrodes on both the top substrate 3 and the bottom substrate 2 is mounted at the end portion of the bottom side of the bottom substrate 2. Herein, reference numeral 8 denotes a light-shielding layer (periphery parting) that blocks light at the periphery of an effective display area.

In the case of the present embodiment, as shown in FIGS. 1 and 2, a plurality of segment electrodes 10, extending in the longitudinal direction in the drawings, are formed in a stripe-wise manner on the bottom substrate 2. On the other hand, a plurality of common electrodes 11, extending in the lateral direction in the drawings, are formed in a stripe-wise manner on the top substrate 3 so as to intersect at right angles with the segment electrodes 10. The segment electrodes 10 are made of, for example, metal having a high light reflectance, such as aluminum, and function not only as the electrodes to apply an electric field on the liquid crystals between the selves and the common electrodes 11, but also function as a transflective film. Hence, the segment electrodes 10 are provided with light transmitting slits 12 at the center of their respective pixels on a one-by-one basis. The pixel referred to herein is, as shown in FIG. 2, defined as each area where the segment electrodes 10 overlap the common electrodes 11 when viewed in a plane.

As shown in FIG. 1, of a plurality of the common electrodes 11, and in particular the upper half of the common electrodes 11 in FIG. 1, routing lines 14 are extracted from the right ends of the common electrodes 11 toward the sealing member 4, and an electrical connection between the top substrate 3 and the bottom substrate 2 is established through a vertically conducting material 41, such as anisotropic conductive particles mixed into the sealing member 4. The routing lines 14 are extracted further to the circumferential portion on the bottom substrate 2 to be connected to the output terminals of the driving semiconductor element 7. Likewise, with regard to the lower half of the common electrodes 11 in FIG. 1, the routing lines 14 are extracted from the left ends of the common electrodes 11 toward the sealing member 4, and an electrical connection is established between the top substrate 3 and the bottom substrate 2 through the vertically conducting material 41, such as anisotropic conductive particles mixed into the sealing member 4. The routing lines 14 are extracted further to the circumferential portion on the bottom substrate 2 to be connected to the output terminals of the driving semiconductor element 7. On the other hand, with regard to the segment electrodes 10, routing lines 15 are extracted from the bottom ends of the segment electrodes 10 toward the sealing member 4 and directly connected to the output terminals of the driving semiconductor element 7.

Also, input lines 16 that supply various kinds of signals to the driving semiconductor element 7 are provided at the bottom side of the bottom substrate 2 toward the input terminals of the driving semiconductor element 7.

With regard to the cross sectional structure, as shown in FIG. 3, the segment electrodes 10 made of a film of metal, such as aluminum, and provided with slits 12 are formed in a stripe-wise manner on the bottom substrate 2 made of a transparent substrate, such as glass or plastics, in a direction penetrating through the paper. On the segment electrodes 10, for example, an alignment film 20 made of polyimide or the like to which the rubbing treatment is applied on the surface is formed. On the other hand, the common electrodes 11 made of indium tin oxide (hereinafter, abbreviated to ITO) are formed in a stripe-wise manner on the top substrate 3 made of a transparent substrate, such as glass or plastics, in a direction in parallel to the paper. On the common electrodes 11, for example, an alignment film 22, made of polyimide or the like to which the rubbing treatment is applied on the surface, is formed. A liquid crystal layer 23, made of liquid crystals having the positive dielectric anisotropy, is sandwiched in a space between the top substrate 3 and the bottom substrate 2. Also, a backlight (omitted in the drawing) is provided at the bottom surface side of the bottom substrate 2.

FIG. 4 is a schematic showing two adjacent segment electrodes 10 on the bottom substrate 2 when viewed in a plane. Each segment electrode 10 extends in the longitudinal direction in the drawing, and therefore, a space S between the adjacent segment electrodes 10 also extends in the longitudinal direction in the drawing. The characteristic of the present embodiment is that the rubbing direction (indicated by a solid line arrow) of the alignment film 20 on the bottom substrate 2 and the rubbing direction (indicated by a broken line arrow) of the alignment film 22 on the top substrate 3 are respectively set to the directions shown in FIG. 4, thereby producing 60° in a counterclockwise direction as a twist angle of the liquid crystal layer 23.

To be more specific, where the normal to the extending direction of the segment electrodes 10 is the reference line (indicated by an alternate long and short dash line), and where a positive angle is the counterclockwise direction and a negative angle be the clockwise direction, then the rubbing direction of the alignment film 20 on the bottom substrate 2 is set at +15°, and the rubbing direction of the alignment film 22 on the top substrate 3 is set at −45', thereby producing 60° as the twist angle of the liquid crystals. Where a layer thickness d of the liquid crystal layer 23 is d=4 μm, for example, by setting the rubbing directions as specified above, the major axial direction of a liquid crystal molecule positioned 1 μm ((¼)d) high from the surface of the bottom substrate 2 is oriented to a direction that is perpendicular to the extending direction of the space between the segment electrodes (in FIG. 4, the liquid crystal molecule is indicated by a capital M).

With the liquid crystal display 1 of the present embodiment, the twist angle θ of the liquid crystal layer 23 is 60° (in a range of θ≦90°). By setting the rubbing directions of the alignment films 20 and 22 respectively on the bottom substrate 2 and the top substrate 3 as specified above, the major axial direction of the liquid crystal molecule positioned (¼)d high from the alignment film surface on the bottom substrate 2 is oriented to a direction that is perpendicular to the extending direction of the space S between the segment electrodes 10 when no electric field is applied to the liquid crystal layer 23. Hence, it is possible to effectively control the disclination caused by a lateral electric field developed between the segment electrodes 10. Consequently, since the width of the light-shielding film covering a display defective area resulting from the disclination can be reduced to the minimum, the aperture ratio can be improved, thereby making it possible to provide a liquid crystal device capable of realizing a bright display while achieving high definition.

Second Embodiment

Figure 5:
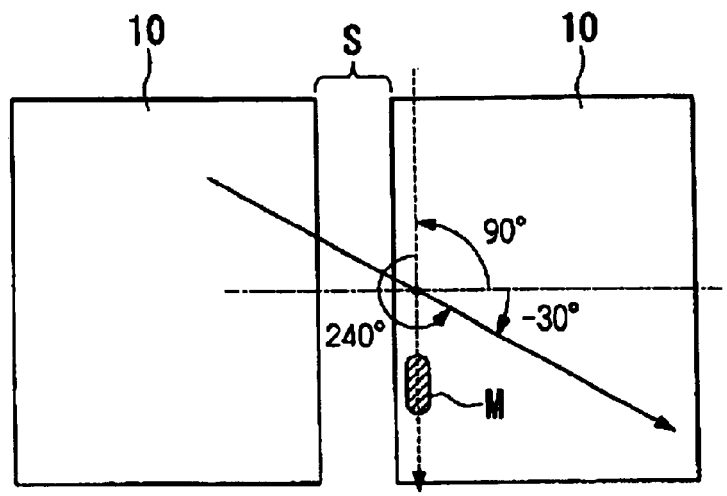
FIG. 5 is a schematic showing a rubbing direction on each substrate of a liquid crystal display according to a second embodiment.

The following description will describe a second embodiment of the present invention with reference to FIG. 5.

FIG. 5 is a schematic plan view showing a rubbing direction on each of the substrates forming a liquid crystal display of the present embodiment. The basic arrangement of the liquid crystal display of the present embodiment is identical with that of the first embodiment except for the twist angle of the liquid crystal layer and the associating rubbing direction on each substrate. Hence, the present embodiment omits the explanation of the arrangement of the entire device, and will only describe a relationship between the twist angle of the liquid crystal layer and the rubbing direction on each substrate.

In the present embodiment, as shown in FIG. 5, the twist angle θ of the liquid crystal layer is 240° in the counterclockwise direction (in a range of 180°≦θ≦270°), and the rubbing direction of the alignment film on the bottom substrate is set at −30° and the rubbing direction of the alignment film on the top substrate is set at +90°. Where a layer thickness d of the liquid crystal layer is d=4 μm, for example, by setting the rubbing directions as specified above, the major axial direction of a liquid crystal molecule positioned 1 μm ((¼)d) high from the alignment film surface on the bottom substrate is oriented to a direction that is in parallel to the extending direction of the space between the segment electrodes (in FIG. 5, the liquid crystal molecule is indicated by a capital M).

In the case of the present embodiment, for those having the twist angle θ of the liquid crystal layer in a range of 180°≦θ≦270°, by setting the rubbing directions of the alignment films on the top and bottom substrates as specified above, the major axial direction of the liquid crystal molecule positioned (¼)d high from the alignment film surface on the bottom substrate is oriented to a direction in parallel to the extending direction of the space between the segment electrodes when no electric field is applied to the liquid crystal layer. Hence, it is possible to effectively control the disclination caused by a lateral electric field developed between the segment electrodes. Consequently, there can be offered the same advantage attained by the first embodiment that since the width of the light-shielding film covering a display defective area resulting from the disclination can be reduced to the minimum, the aperture ratio can be enhanced, thereby making it possible to provide a liquid crystal device capable of realizing a bright display while achieving high definition.

Third Embodiment

Figure 6:
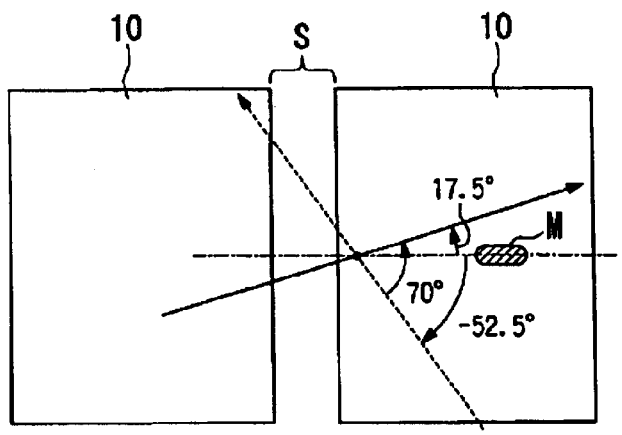
FIG. 6 is a schematic showing a rubbing direction on each substrate of a liquid crystal display according to a third embodiment.

The following description will describe a third embodiment of the present invention with reference to FIG. 6.

FIG. 6 is a schematic plan view showing a rubbing direction on each of the substrates forming a liquid crystal display of the present embodiment. The basic arrangement of the liquid crystal display of the present embodiment is also identical with that of the first embodiment except for the twist angle of the liquid crystal layer and the associating rubbing direction on each substrate. Hence, the present embodiment omits the explanation of the arrangement of the entire device, and will only describe a relationship between the twist angle of the liquid crystal layer and the rubbing direction on each substrate.

The first and second embodiments describe examples of a countermeasure against the disclination between the adjacent segment electrodes. The present embodiment will focus on a slit portion on the segment electrode, and will describe an example of the countermeasure against the disclination at this portion.

Hence, in FIG. 6, a slit that extends in the longitudinal direction in the drawing in one segment electrode is to be considered. In the case of the present embodiment, the twist angle θ of the liquid crystal layer is 70° (in a range of θ≦90°) in the counterclockwise direction, and the rubbing direction of the alignment film on the bottom substrate is set at +17.5°, and the rubbing direction of the alignment film on the top substrate is set at −52.5°. Where a layer thickness d of the liquid crystal layer is d=4 μm, for example, by setting the rubbing directions as specified above, the major axial direction of a liquid crystal molecule positioned 1 μm ((¼)d) high from the alignment film surface on the bottom substrate is oriented to a direction that is perpendicular to the longitudinal direction (extending direction) of the slit (in FIG. 6, the liquid crystal molecule is indicated by a capital M).

In the case of the present embodiment, for those having the twist angle θ of the liquid crystal layer in a range of θ≦90°, by setting the rubbing directions of the alignment films on the top and bottom substrates as specified above, the major axial direction of the liquid crystal molecule positioned (¼)d high from the alignment film surface on the bottom substrate is oriented to a direction that is perpendicular to the extending direction of the slit when no electric field is applied to the liquid crystal layer. Hence, it is possible to effectively control the disclination caused by a lateral electric field developed at the slit portion. Consequently, there can be offered the same advantage attained by the first and second embodiments that since the width of the light-shielding film covering a display defective area resulting from the disclination can be reduced to the minimum, the aperture ratio can be enhanced, thereby making it possible to provide a liquid crystal device capable of realizing a bright display while achieving high definition.

Electronic Apparatus

The following description will describe examples of electronic apparatus provided with the liquid crystal displays of the above embodiments.

Figure 13:
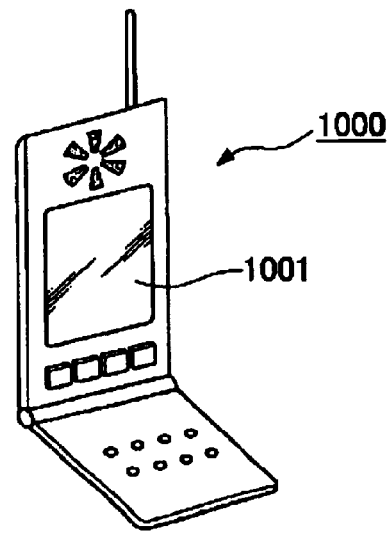
FIG. 13 is a perspective view showing an example of electronic apparatus provided with a liquid crystal device of the present invention.

FIG. 13 is a perspective view showing an example of a mobile phone. In FIG. 13, reference numeral 1000 denotes a mobile phone main body, and reference numeral 1001 denotes a liquid crystal display unit using the above liquid crystal display.

Figure 14:
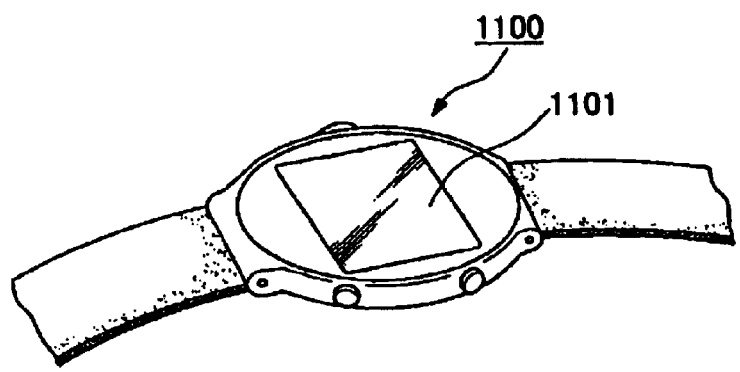
FIG. 14 is a perspective view showing another example of electronic apparatus provided with a liquid crystal device of the present invention.

FIG. 14 is a perspective view showing an example of electronic apparatus of a wrist watch type. In FIG. 14, reference numeral 1100 denotes a watch main body, and reference numeral 1101 denotes a liquid crystal display unit using the above liquid crystal display.

Figure 15:
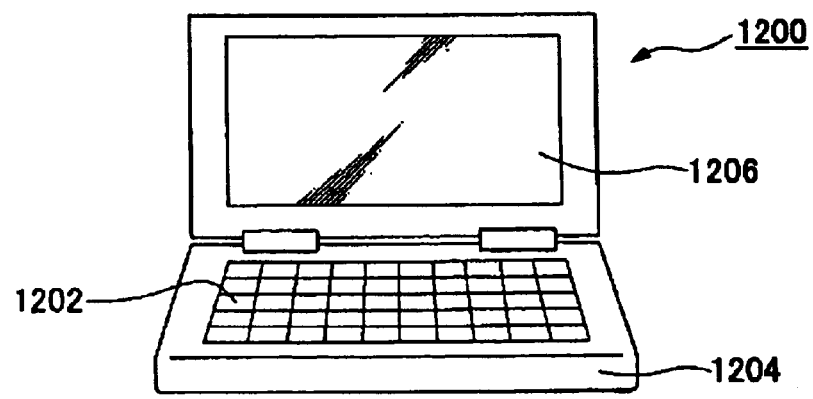
FIG. 15 is a perspective view showing a further example of electronic apparatus provided with a liquid crystal device of the present invention.

FIG. 15 is a perspective view showing an example of a portable information processing device, such as a word processor or a personal computer. In FIG. 15, reference numeral 1200 denotes an information processing device, reference numeral 1202 denotes an input unit, such as a keyboard, reference numeral 1204 denotes an information processing device main body, and reference numeral 1206 denotes a liquid crystal display unit using the above liquid crystal display.

All of the examples of the electronic apparatus shown in FIGS. 13 through 15 are provided with the liquid crystal display units using the liquid crystal devices of the above embodiments, and therefore, can realize a bright image with a high display quality.

It should be appreciated that the technical field of the present invention is not limited to the above embodiments, and the present invention can be modified in various manners without deviating from the scope thereof. For example, the above embodiments describe the transflective liquid crystal display of the passive matrix method by way of example. However, the present invention can be applied to those of the active matrix method, and in regard to the control on the disclination caused by a space between the pixels, it can be applied to either type of the transmission type and the reflection type. Also, in the present invention, the phrases, such as the extending direction of the space between the electrodes or the opening portion, were used. However, in case that the opening portion is a square, for example, the concept of the extending direction is ambiguous. In such a case, as occasion demands, the designer may define any of the directions as the extending direction of the opening portion such that a desired bright view direction is obtained.

EXAMPLES

The inventor of the present invention performed simulations with regard to the relationship between the twist angle of the liquid crystal layer and the rubbing direction on the bottom substrate. The following description reports the results.

Figure 7:
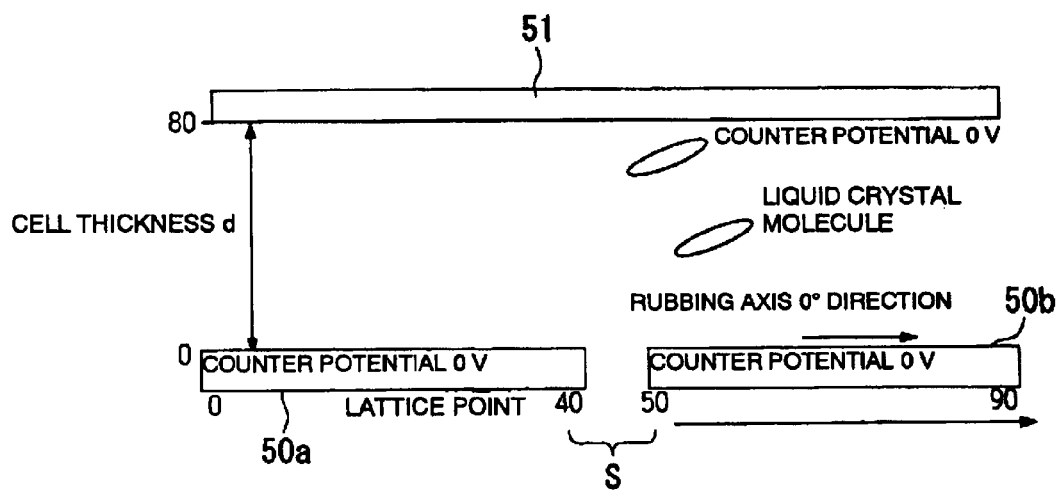
FIG. 7 is a schematic showing a model of a liquid crystal device used for simulations in Examples.

A liquid crystal cell used as a simulation model is shown in FIG. 7, which is intended to represent two adjacent pixel electrodes 50a and 50b and a counter electrode 51. In order to represent a position (coordinate) in the horizontal direction of the cell, the dimension in the horizontal direction is divided by lattices of a certain unit length so that a position is represented by a lattice point, and the lattice point "0" is set at the left end of the pixel electrode 50a in the left and the lattice point "40" is set at the right end thereof, while the lattice point "50" is set at the left end of the pixel electrode 50b in the right and the lattice point "90" is set at the right end thereof. Hence, a space from the lattice points 40 to 50 corresponds to a space S between the pixel electrodes. The space S extends in a direction that is perpendicular to the paper and it is assumed that a lateral electric field develops in the width direction of the paper. Also, in order to represent a position (coordinate) in the vertical direction (the layer thickness direction of the liquid crystal layer) of the cell, the lattice point "0" is set on the surface of the pixel electrode 50a and the lattice point "80" is set on the surface of the counter electrode 51.

As the simulation conditions in addition to the foregoing, 5 V is provided as is provided as a voltage to be applied to the pixel electrodes, 0 V is provide as a voltage to be applied to the counter electrode, and 5 μm is provided as the cell thickness d.

Example 1

Initially, Example 1 will discuss a case where the twist angle θ of the liquid crystal layer is set as θ=60° (θ≦90°).

Figure 8:
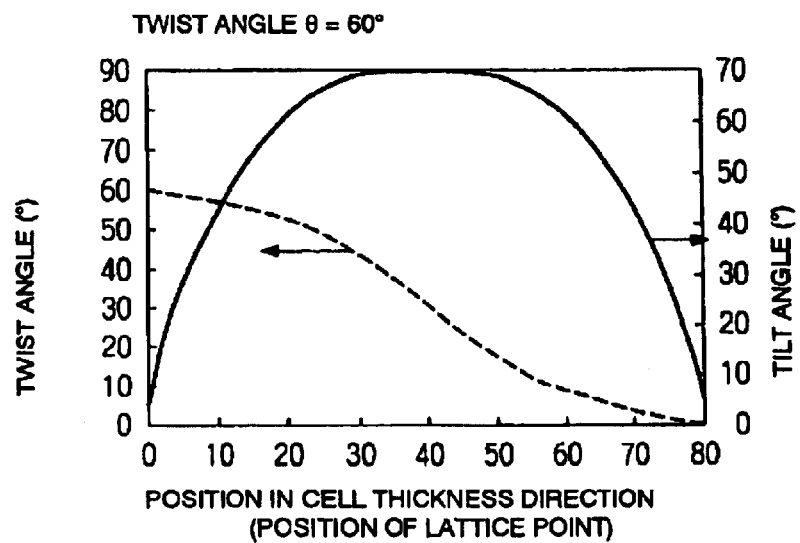
FIG. 8 is a graph showing simulation results in Example 1, which is a graph showing a twist angle distribution curve and a tilt angle distribution curve in a cell thickness direction when an electric field is applied in an ideal state at the twist angle of 60°.

FIG. 7 is intended to represent two spaced adjacent pixel electrodes 50a and 50b. However, where one pixel electrode, instead of the two pixel electrodes, has an infinite length in the horizontal direction, then a lateral electric field would not be developed at all in the liquid crystal layer, and it is sufficient to consider the behavior of the liquid crystal molecules responding to a longitudinal electric field between the pixel electrode and the counter electrode alone. This case is referred to as the ideal state. If an electric field is applied to the pixel electrode in this state, then each liquid crystal molecule in the liquid crystal layer twists (this motion is referred to as twist) while rising up along the electric field (this motion is referred to as tilt). FIG. 8 shows distributions of the twist angle and the tilt angle of the liquid crystal molecules at each position in the cell thickness direction where an electric field is applied in the ideal state. In FIG. 8, the horizontal axis represents a position (a position represented by the lattice point) of each liquid crystal molecule in the cell thickness direction, the vertical axis in the left represents the twist angle (°), and the vertical axis in the right represents the tilt angle (°).

Figure 9:
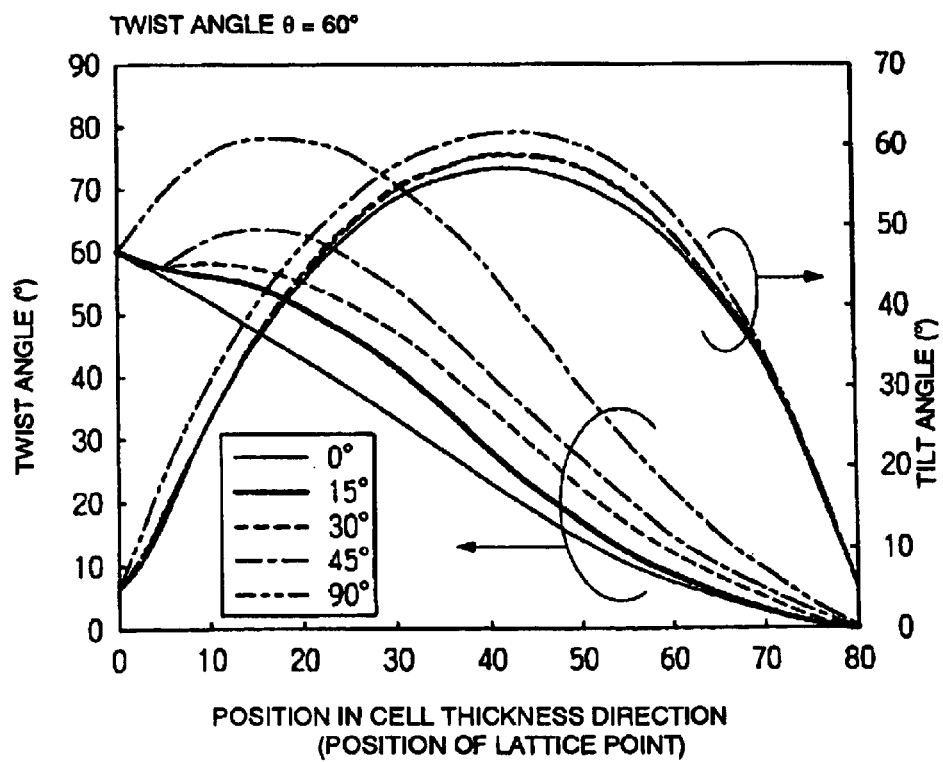
FIG. 9 is a graph showing twist angle distribution curves and tilt angle distribution curves in a cell thickness direction when an electric field is applied and a bottom substrate rubbing direction is changed at the twist angle of 60°.

As shown in FIG. 8, it is understood that the twist angle distribution curve is regulated to be 60° at the lattice point 0, and to be 0° at the lattice point 80 by the rubbing directions on the top and bottom substrates, and tends to change gradually in between. The tilt angle distribution curve is regulated to be 5° at the substrate surfaces, that is, at the lattice points 0 and 80 by a pre-tilt given to the top and bottom substrates, and shapes a parabolic curve having the vertex at or around 70° in between. Next, the following description discusses a case intended to represent two spaced pixel electrodes as shown in FIG. 7 where a lateral electric field develops. Herein, the angle of the rubbing direction is represented in the same manner as are in FIGS. 4 through 6, and the twist angle distribution and the tilt angle distribution are measured by changing the bottom substrate rubbing direction to 0°, 30°, 45° and 90°, the results of which are set forth in FIG. 9. If these twist angle distribution curve and tilt angle distribution curve are closer to the shapes of the distribution curves in the ideal state shown in FIG. 8, it can be judged that the influence of the lateral electric field is smaller, that is, the disclination occurs less frequently.

From such a point of view, as to the parabolic tilt angle distribution curve, there is no significant difference when the bottom substrate rubbing direction is changed, and a difference from the one in the ideal state is not obvious. On the contrary, as to the twist angle distribution curve, a noticeable difference appears in the distribution curve when the bottom substrate rubbing direction is changed. For example, where the bottom substrate rubbing direction is at 90°, there is a tendency that the twist angle increases to 60° or more on the lattice points from 1 to 40 (the side closer to the bottom substrate), and decreases thereafter, which shows a considerable difference from the one in the ideal state. The distribution curve in the ideal state is positioned between the distribution curves when the bottom substrate rubbing directions are at 0° and 30°. It is discovered that when the bottom substrate rubbing direction is at 15°, the distribution curve coincides with the one in the ideal state.

The above description describes in detail the simulation results where the twist angle of the entire liquid crystal layer is 60°. The inventor of the present invention performed similar simulations by changing the twist angle to values other than 60° (45° and 90°), and found combinations of the twist angle of the liquid crystal layer and the bottom substrate rubbing direction closest to those in the ideal state. These combinations are set forth in Table 1 below.

TABLE 1

| Twist angle (°) | 0 | 45 | 60 | 90 |
|---|---|---|---|---|
| Bottom substrate rubbing direction (°) | 0 | 11 | 15 | 22.5 |

As set forth in Table 1, the results show that when the twist angle is 45°, the bottom substrate rubbing direction is at 11°, where the twist angle is 60°, the bottom substrate rubbing direction is at 15°, and where the twist angle is 90°, the bottom substrate rubbing direction is at 22.5°, and there is a relationship that the twist angle is four times the angle of the bottom substrate rubbing direction. In other words, where the extending direction of the space between the pixel electrodes is also taken into consideration, by arranging the major axial direction of the liquid crystal molecule positioned as high as ¼ of the liquid crystal layer from the surface of the bottom substrate to be oriented to a direction perpendicular to the extending direction of the space, and by setting the rubbing direction on each of the top and bottom substrates by the inverse calculation in association with the twist angle, it is possible to control the disclination caused by a lateral electric field. The above description describes the case of the space between the electrodes. However, the case of the slits can be considered in the same manner except that the polarities of the electrodes at the both sides are never reversed.

Example 2

Next, Example 2 discusses a case where the twist angle θ of the liquid crystal layer is 180°≦θ≦270°. In Example 1 where θ≦90°, the technique of finding the optimal bottom substrate rubbing direction by comparing the twist angle distribution curve with the one in the ideal state is adopted. However, in the case where the twist angle θ of the liquid crystal layer is 180°≦θ≦270°, it is difficult to make a comparison with the ideal state by adopting the above technique. Therefore, a technique of comparing transmittance curves when the bottom substrate rubbing direction is changed is adopted.

Figure 10:
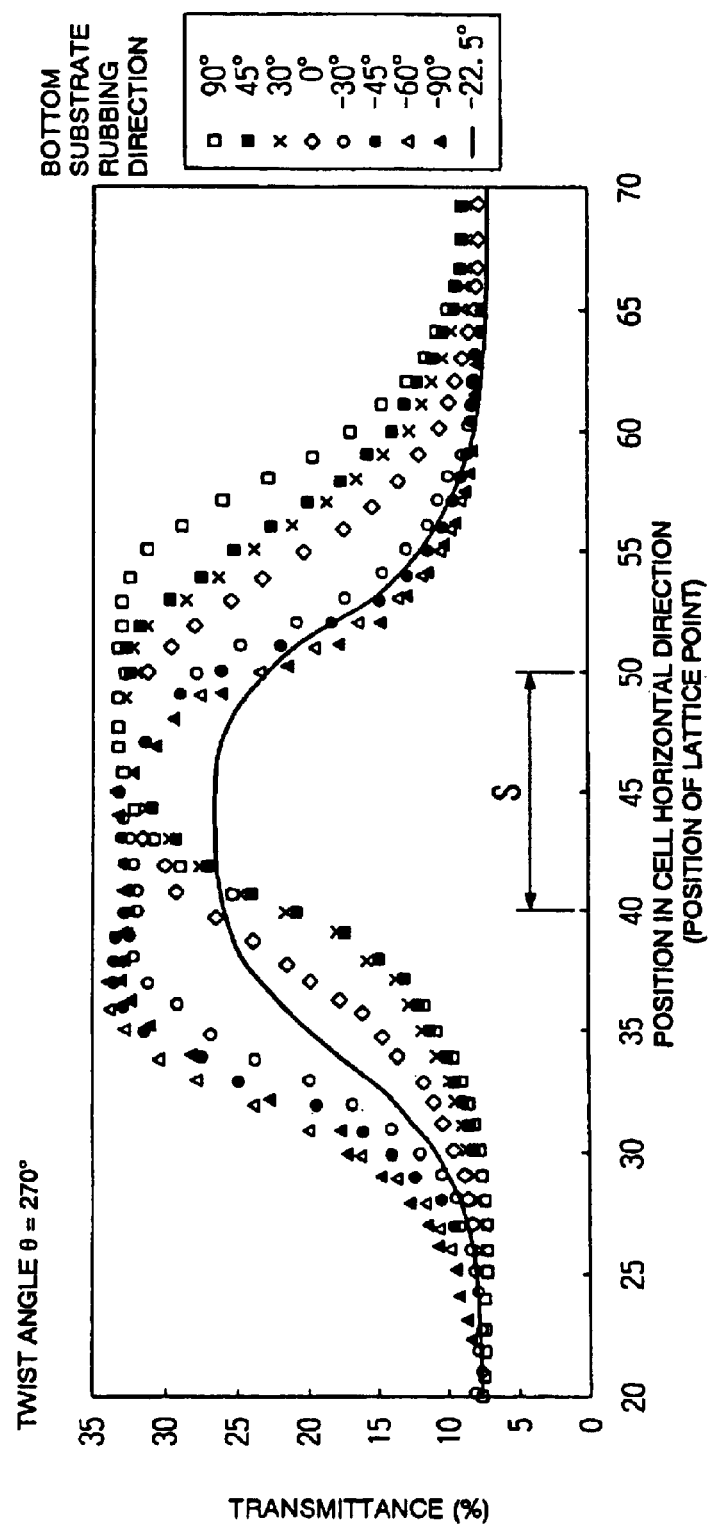
FIG. 10 is a graph showing simulation results in Example 2, which is a graph showing transmittance distribution curves at a black display when a bottom substrate rubbing direction is changed at the twist angle of 270°.

FIG. 10 shows a transmittance distribution at a black display in a case where the twist angle of the liquid crystal layer is 270°. The area at the lattice points from 40 to 50 on the horizontal axis represents a space S between the pixel electrodes, and disclination caused by a lateral electric field occurs in this area S, so that transmittance is increased due to leakage of light where it should be a black display. Ideally speaking, it is preferable that the transmittance distribution curve shapes no crest in this area S, but it is difficult to attain in practice. Hence, the transmittance distribution curve shaping a crest symmetric with respect to a vertical line at the lattice point 45 where a lateral electric field develops is the optimal bottom substrate rubbing direction. The reason is that, when consideration is given to covering leakage of light resulting from the disclination with the light-shielding layer, the crest asymmetric with respect to a vertical line would require the light-shielding layer to be designed so as to match either the right or left area which has the larger light leakage area in consideration of the pattern misalignment generated in the production process. Accordingly, the aperture ratio would be reduced considerably. However, where the crest is symmetric with respect to a vertical line, the width of the light-shielding layer can be reduced to the minimum and the aperture ratio can be enhanced.

In FIG. 10, the bottom substrate rubbing direction is changed in a range from −90° to +90°. However, when FIG. 10 is reviewed from the foregoing point of view, where the bottom substrate rubbing direction is at −22.5° (indicated by a solid line), the transmittance distribution curve shapes the lowest crest, and is almost symmetric with respect to a vertical line at the position on the lattice point 45. Hence, where the twist angle of the liquid crystal layer is 270°, it can be said that the bottom substrate rubbing direction at −22.5° makes the best combination.

Figure 11:
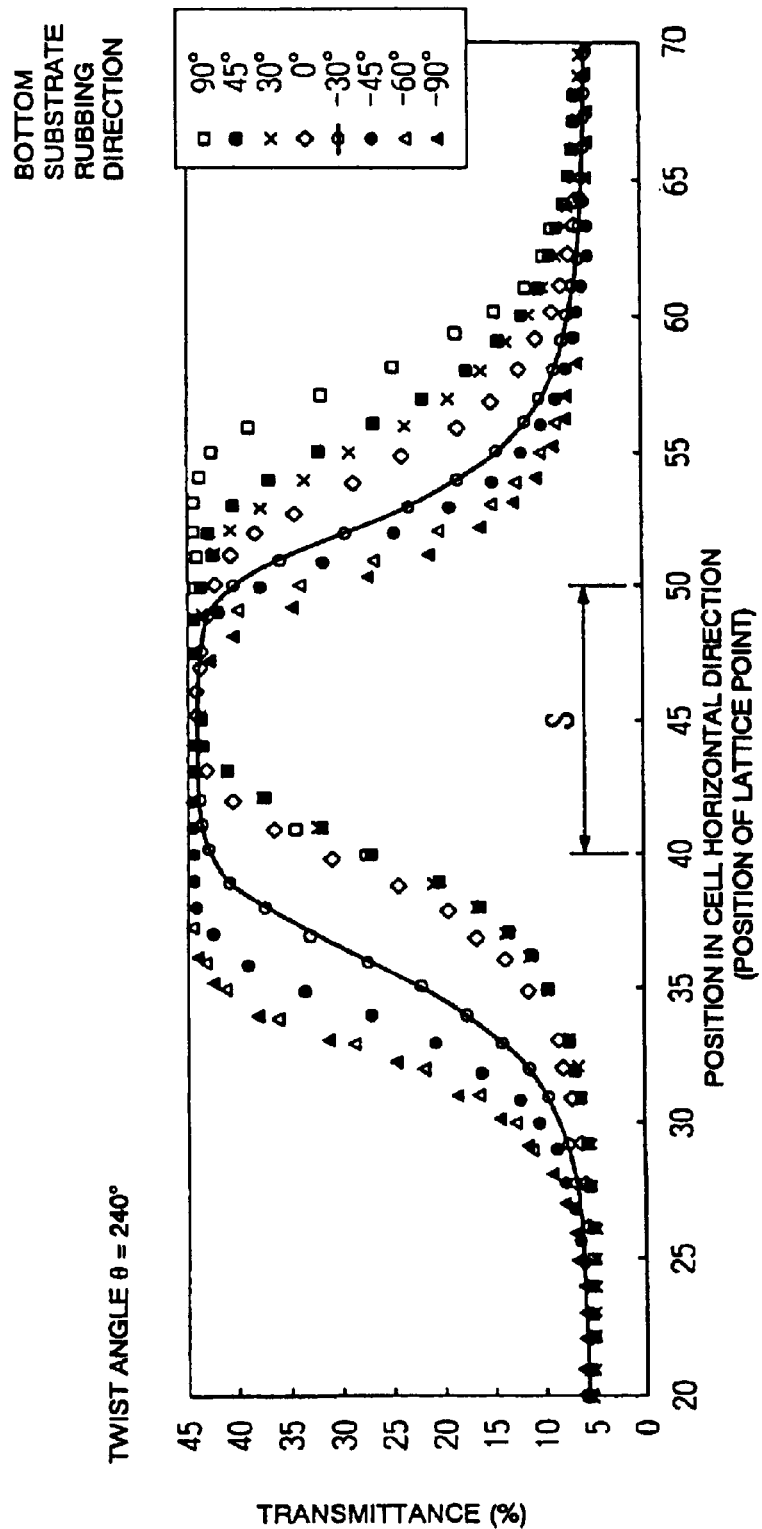
FIG. 11 is a graph showing transmittance distribution curves at a black display when a bottom substrate rubbing direction is changed at the twist angle of 240°.
Figure 12:
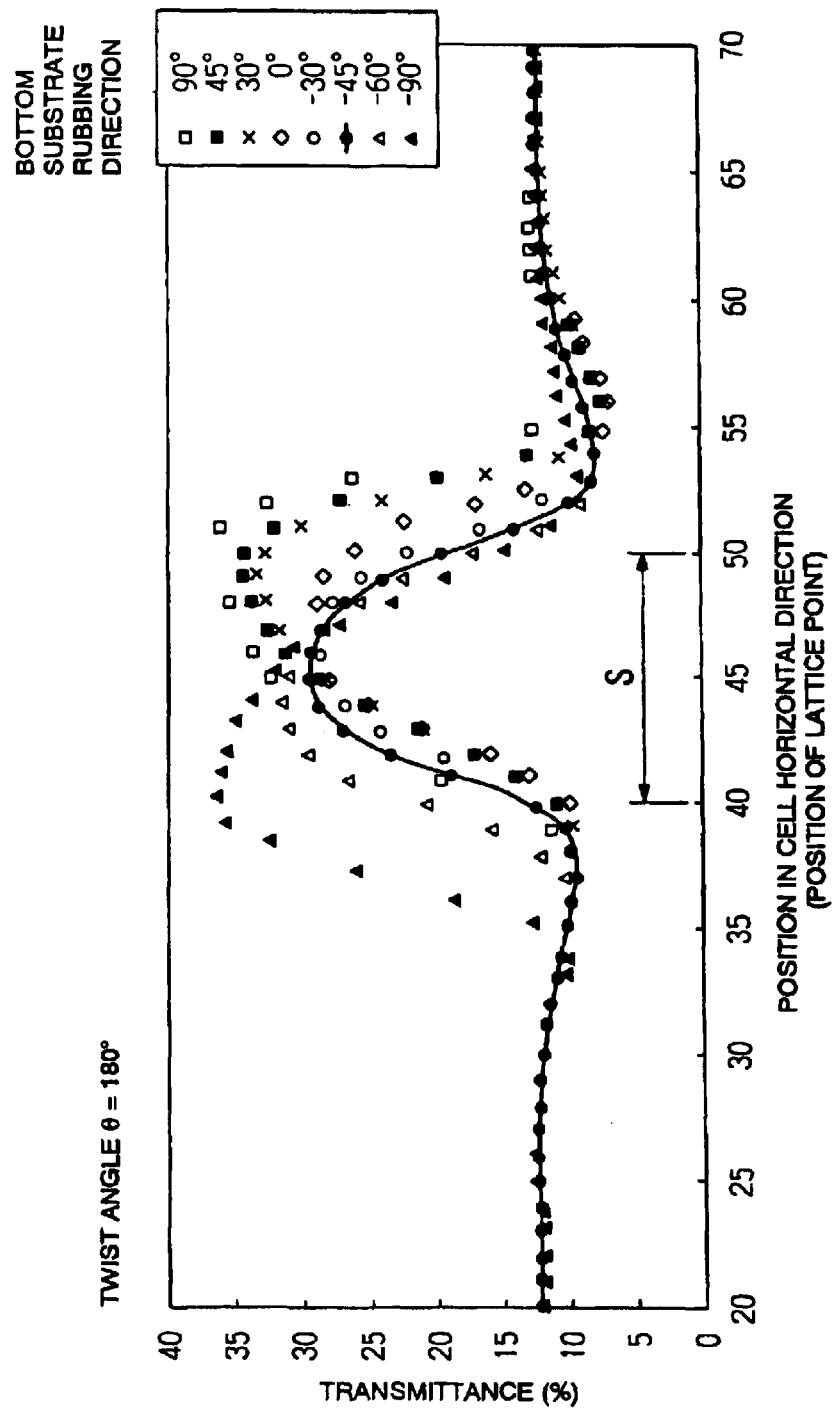
FIG. 12 is a graph showing transmittance distribution curves at a black display when a bottom substrate rubbing direction is changed at the twist angle of 180°.

Likewise, FIG. 11 shows a transmittance distribution curve in a case where the twist angle of the liquid crystal layer is 240°, and FIG. 12 shows a transmittance distribution curve in a case where the twist angle of the liquid crystal layer is 180°. It can be said that where the twist angle of the liquid crystal layer is 240°, the bottom substrate rubbing direction at −30° (indicated by a solid line in FIG. 11) makes the best combination, and where the twist angle of the liquid crystal layer is 180°, the bottom substrate rubbing direction at −45° (indicated by a solid line in FIG. 12) makes the best combination.

In addition to the foregoing, the best combinations including a case where the twist angle of the liquid crystal layer is 210° are set forth in Table 2 below.

TABLE 2

| Twist angle (°) | 270 | 240 | 210 | 180 |
|---|---|---|---|---|
| Bottom substrate rubbing direction (°) | −22.5 | −30 | −37.5 | −45 |

The results in Table 2 reveal that, where the extending direction of the space between the pixel electrodes is also taken into consideration, in Example 2 where the twist angle θ of the liquid crystal layer is 180°≦θ≦270°, by arranging the major axial direction of the liquid crystal molecule positioned as high as ¼ of the liquid crystal layer from the surface of the bottom substrate to be oriented to a direction in parallel to the extending direction of the space, and by setting the rubbing direction on each of the top and bottom substrates by the inverse calculation in association with the twist angle, it is possible to control the disclination caused by a lateral electric field most effectively. The above description explains the case of the space between the electrodes, but the same applies to the case of the slits.

According to the study of the inventor of the present invention, a clear correlation with the rubbing direction has not been discovered where the twist angle θ is in a range of 90°<θ<180°.

However, the liquid crystal display is not actually used in the above specified range, and this range is not addressed by the present invention. Advantages of the Invention As has been discussed in detail, according to the present invention, by optimizing the initial alignment direction of the liquid crystal layer with respect to the extending direction of the space between the electrodes, or the opening portion in association with the twist angle of the liquid crystal layer, it is possible to control the disclination caused by a lateral electric field so that the aperture ratio is enhanced, thereby making it possible to provide a liquid crystal device capable realizing a bright display while attaining high definition.

What is claimed is:

1. A liquid crystal device, comprising:

a pair of substrates; and a liquid crystal layer sandwiched by the pair of substrates, one substrate of the pair of substrates being provided with a plurality of electrodes that also serve as a transflective layer to reflect incident light from the other substrate side through the liquid crystal layer, and transmit incident light from an outer surface side of the one substrate to the liquid crystal layer side through an opening portion, such that:

where a twist angle θ of the liquid crystal layer sandwiched by the pair of substrates is in a range of θ≦90°, and d is a layer thickness of the liquid crystal layer, then alignment treatment in a direction corresponding to the twist angle is applied onto each of the pair of substrates in such a manner that, in a state that no voltage is applied, a direction of the long axis of a liquid crystal molecule positioned (¼)d high from a surface of the one substrate is oriented to a direction that is perpendicular to a direction in which the opening portion extends.

* * * * *